United States Patent
Yamasaki

(10) Patent No.: US 7,565,572 B2
(45) Date of Patent: Jul. 21, 2009

(54) METHOD FOR ROLLING BACK FROM SNAPSHOT WITH LOG

(75) Inventor: Yasuo Yamasaki, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/192,190

(22) Filed: Aug. 15, 2008

(65) Prior Publication Data

US 2009/0044046 A1    Feb. 12, 2009

Related U.S. Application Data

(63) Continuation of application No. 11/271,821, filed on Nov. 14, 2005, now Pat. No. 7,428,657.

(30) Foreign Application Priority Data

Oct. 20, 2005   (JP) .............................. 2005-305556

(51) Int. Cl.
*G06F 11/00* (2006.01)
(52) U.S. Cl. ......................................................... 714/6
(58) Field of Classification Search .................. 714/5–8
See application file for complete search history.

(56) References Cited

U.S. PATENT DOCUMENTS

| | | | | |
|---|---|---|---|---|
| 5,043,871 A | * | 8/1991 | Nishigaki et al. ........... 707/202 |
| 5,996,088 A | * | 11/1999 | Frank et al. ..................... 714/6 |
| 6,065,018 A | * | 5/2000 | Beier et al. .................. 707/202 |
| 6,253,212 B1 | * | 6/2001 | Loaiza et al. ............... 707/202 |
| 6,594,744 B1 | * | 7/2003 | Humlicek et al. ........... 711/162 |
| 6,665,815 B1 | * | 12/2003 | Goldstein et al. ............. 714/20 |
| 6,668,264 B1 | | 12/2003 | Patterson et al. |
| 6,792,518 B2 | * | 9/2004 | Armangau et al. .......... 711/162 |
| 6,877,109 B2 | * | 4/2005 | Delaney et al. ................ 714/6 |
| 7,007,044 B1 | * | 2/2006 | Rafert et al. ................. 707/203 |
| 7,124,323 B2 | * | 10/2006 | Sanchez et al. ............... 714/19 |
| 7,243,197 B2 | * | 7/2007 | Yamagami ................... 711/161 |
| 2003/0097611 A1 | * | 5/2003 | Delaney et al. ............... 714/13 |
| 2004/0163009 A1 | * | 8/2004 | Goldstein et al. .............. 714/6 |

* cited by examiner

*Primary Examiner*—Bryce P Bonzo
(74) *Attorney, Agent, or Firm*—Brundidge & Stanger, P.C.

(57) ABSTRACT

High speed differential copy can be implemented in the failback after disaster recovery when the data of the primary site is protected safely. When a restore command is issued, the common snapshots of the snapshots of the primary site and the secondary site are extracted as the base snapshot by comparing the log tables of the primary site and secondary site. The volume of the primary site is rolled back with the extracted snapshots. The latest snapshot of the volume of the secondary site is transmitted to the primary site and it is applied to the volume of the primary site to synchronize the volumes of the primary site and the secondary site.

15 Claims, 17 Drawing Sheets

Transaction log table 120

| Transfer time | Class | Volume name | Snapshot time | Communication destination address |
|---|---|---|---|---|
| 09:02 | SEND | Vol1 | 09:00 | 10.0.0.2 |
| 09:05 | RECV | Vol2 | 09:00 | 10.0.0.2 |
| 10:02 | SEND | Vol1 | 10:00 | 10.0.0.2 |
| 10 :05 | RECV | Vol2 | 10:00 | 10.0.0.2 |

METHOD FOR ROLLING BACK FROM SNAPSHOT WITH LOG

The present application is a continuation of application Ser. No. 11/271,821, filed Nov. 14, 2005 now U.S. Pat. No. 7,428, 657; which claims priority from Japanese application JP 2005-305556, filed on Oct. 20, 2005, the content of which is hereby incorporated by reference into this application.

BACKGROUND OF THE INVENTION

This invention relates to a method for rollback from a snapshot to a volume with log in a storage system.

In the storage system in recent years, application of recovery from disaster (disaster recovery) using remote copy has been increased. Disaster recovery is aimed at continuation of business when a failure occurs due to disaster by copying data from an operating site (primary site) to a remote site (secondary site).

In the conventional computer systems, only the database process of the businesses having critical mission among those which give the largest influence on continuation of business has been considered as an object of copy to the remote site (remote copy). However, in recent years, non-database process of the peripheral businesses is also gradually considered as an object of remote copy in view of further reducing non-service period when a failure occurs. For the remote copy of the businesses having critical mission, synchronous copy for immediately transferring updated data using an expensive leased line has been conducted in general in order to prevent missing of data due to delay of copy. On the other hand, for the businesses having no critical mission, asynchronous copy for transferring intermittently the updated data at a time is generally conducted in order to save communication cost because missing of the latest data can be permitted to a larger extent than the database process (e.g., U.S. Pat. No. 6,668,264).

Service stoppage in disaster recovery occurs in the timing of fail-over in which the secondary site takes over businesses of the primary site when a failure occurs and the timing of fail-back in which the primary site immediately takes over businesses of the secondary site when the primary site recovers from the failure. In the fail-back mode, after the data of the primary site is synchronized with the data of the secondary site, the remote copy operation from the primary site to the secondary site is restarted. A series of disaster recovery beginning from the fail-over mode to the fail-back mode can be completed by returning the business which has been taken over by the secondary site to the primary site.

SUMMARY OF THE INVENTION

Disaster recovery is impossible when a failure occurs again during copy of data from the secondary site to the primary site in the fail-back mode explained as the related art. Therefore, data from the secondary site to the primary site must be copied quickly. If the primary site has entered the complete defective state, all data must be copied from the secondary site to the primary site and copying operation requires much time. Meanwhile, when the data in the primary site is protected from a failure such as communication failure between the primary site and the secondary site, the copying time can be reduced by transferring only differential data in place of full-copy of all data.

However, when updating is requested in the secondary site under the remote copy environment based on asynchronous copy, the data are individually updated at both primary site and secondary site and the differential copy of the fail-back process cannot directly be conducted. Namely, when the secondary site continues the businesses through fail-over from the primary site to the secondary site, data is updated at the secondary site due to an access from a client. Accordingly, it is required to previously adjust the state of the primary site for enabling the differential copy from the secondary site to the primary site.

The method for synchronizing again the remote copy disclosed in U.S. Pat. No. 6,668,264 explained as the related art has an advantage that high speed synchronization can be attained, when the primary site and the secondary site which are once separated are synchronized again through connection thereof, by comparing the lists of differential copies in the primary site and the secondary site and then transferring only the necessary differential copy after extraction of the common differential copy. However, in the related art explained above, the problem that communication process requires much time is still left unsolved, because the data in the primary and secondary sites must be compared through the communication as the pre-process of the differential copy in the fail-back mode.

Accordingly, this invention has been proposed in order to solve the problems explained above. Therefore, an object of this invention is to implement high speed copy in the fail-back mode after disaster recovery when the data in the primary site is protected safely.

According to one aspect of this invention, a restoring method of a storage system is proposed, which is provided with a first storage system having a first volume for reference or update of stored data, a second storage system having a second volume for storing duplicated data of the first volume, and a network for connecting the first storage system and the second storage system, in view of conducting reference or update of data stored in the second volume when a failure occurs in the first volume and restoring contents of the second volume to the first volume when the first volume recovers from the failure. In this restoring method of the storage system, the first storage system creates a snapshot of the first volume, the first storage system transmits the snapshot to the second storage system, the first storage system stores, to a first log storage unit, communication history of the snapshot transmitted to the second storage system, the second storage system applies the snapshot received from the first storage system to the second volume for synchronization and stores communication history of the snapshot received to a second log storage unit, the second storage system creates a snapshot of the synchronized second volume, the second storage system accepts a restore command of data from the second volume to the first volume. When such restore command exists, the second storage system compares the first log storage unit with the second log storage unit and extracts, as the base snapshot, the common snapshot of the snapshot of the first volume and the snapshot of the second volume. Moreover, the second storage system rolls back the base snapshot of the first volume extracted by the first storage system by applying it to the first volume and transmits the latest snapshot of the second volume to the first volume. Finally, the second storage system synchronizes the first volume to the second volume by applying the snapshot received with the first storage systems to the first volume.

Moreover, transmission and reception of the snapshots of the first storage system and the second storage system are performed based on the differential data.

According to another aspect of this invention, data from the second storage system to the first storage system can be synchronized quickly because the base snapshot can be decided by comparing communication histories of the first log storage unit and the second log storage unit at the time of restoring through synchronization of the first volume of the first storage system with the second volume of the second storage system. Particularly, high speed differential copy can be implemented in the fail-back mode after disaster recovery when the primary site has been protected safely.

BRIEF DESCRIPTION OF THE DRAWINGS

FIG. 3 is an explanatory diagram illustrating a structure of transaction log table.

DESCRIPTION OF THE PREFERRED EMBODIMENTS

A preferred embodiment of this invention will be explained with reference to the accompanying drawings.

Figure 1:
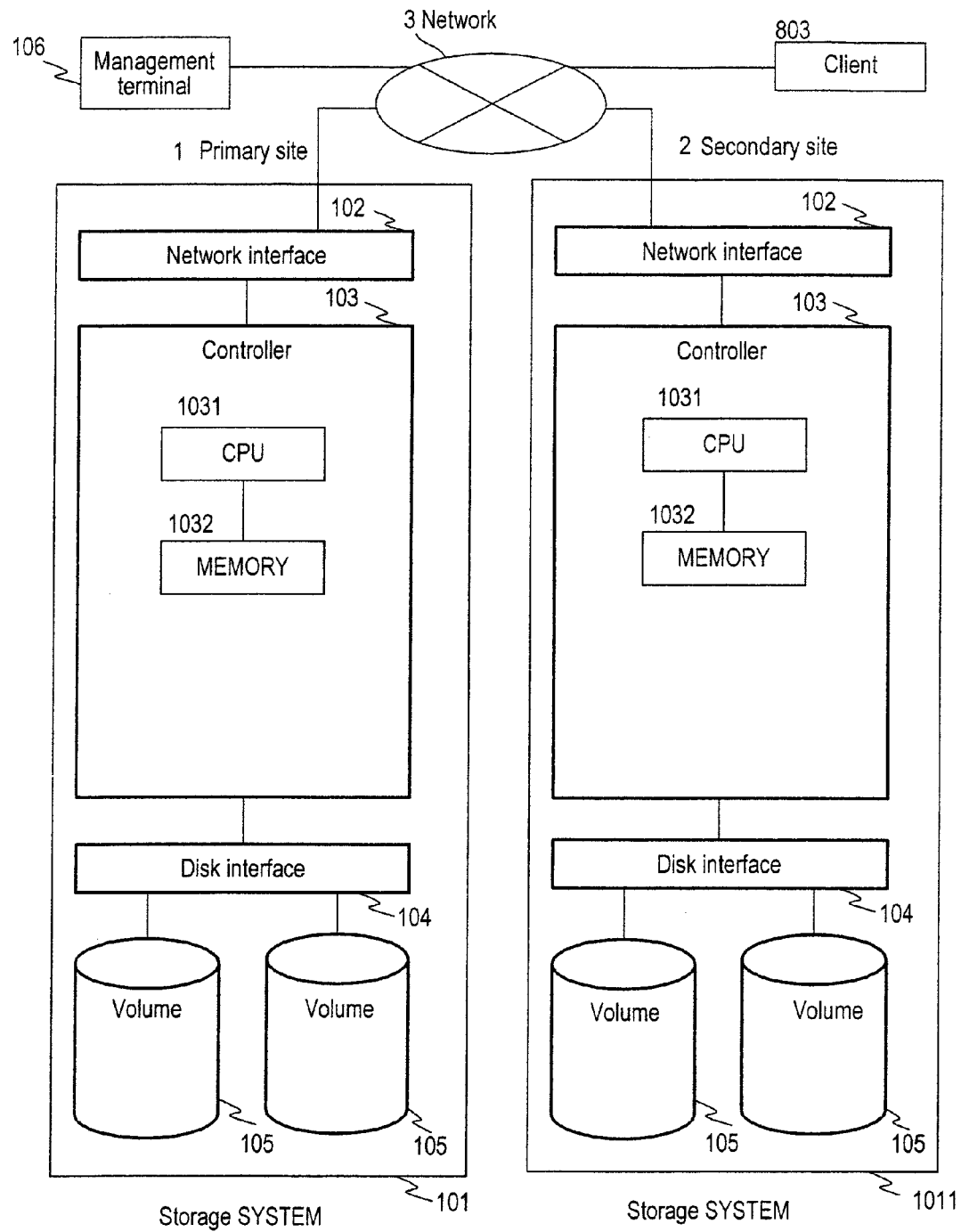
FIG. 1 is a block diagram illustrating an example of a first embodiment of a computer system to which this invention is applied.

FIG. 1 is a block diagram of a computer system as the first embodiment of this invention using a storage system as the main device. In FIG. 1, a primary site 1 is mainly constituted with a storage system 101 accessed from a client computer 803 and a management terminal 106 provided for management of the storage system 101. The storage system 101 at the primary site 1 transmits differential copy to a storage system 1011 at a secondary site 2 via a network 3 and the storage system 1011 executes backup of data of the storage system 101. If a failure occurs at the primary site 1, the secondary site 2 executes fail-over process for continuation of business at the primary site 1. When a failure at the primary site 1 is repaired, the secondary site 2 transmits the differential copy to the storage system 101 at the primary site 1 as will be explained later to conduct the fail-back process and rollback process for synchronizing the primary and secondary sites 1, 2.

The storage system 101 at the primary site 1 and the storage system 1011 at the secondary site 2 are connected with a network 3. The storage system 101 at the primary site 1 is connected with a management terminal 106 via the network 3. The storage system 101 comprises a network interface 102, a controller 103, a disk interface 104, and a volume 105. The controller 103 includes a CPU 1031 for arithmetic processes and a memory 132 for storing programs and data in order to control the network interface 102 and disk interface 104. The network interface 102 executes communication control in combination with the network 3. The disk interface 104 controls read and write operations (reference or update) for multiple volumes 105 assigned to a disk drive (not illustrated).

The storage system 1011 at the secondary site 2 comprises, like the storage system 101 at the primary site 1, the network interface 102, controller 103, disk interface 104, and volume 105. The network 3 comprises, e.g., an IP network or the like.

In addition, the storage system 101 at the primary site 1 and the storage system 1011 at the secondary site 2 make communications with each other via the network 3 and form a disaster recovery system. Moreover, data of the volume 105 in storage system 101 at primary site 1 is stored, as will be explained later, to the storage system 1011 at secondary site 2 through differential remote copy using a snapshot.

Moreover, in the following explanation, the purpose of executing high speed differential copy in the fail-back mode after disaster recovery when the primary site is protected safely has been implemented without execution of preceding communication process.

First, details of the storage systems 101, 1011 will be explained with reference to FIG. 2 to FIG. 9. Thereafter, the remote copy operation using the storage systems 101, 1011 and evaluation of the rollback (fail-back) method from a snapshot to the volume with log in such remote copy operation will be explained with reference to FIG. 10 to FIG. 13. Here, only the storage system 101 will be explained because the storage system 101 at the primary site 1 is constituted in the same manner as the storage system 1011 at the secondary site 2.

Figure 2:
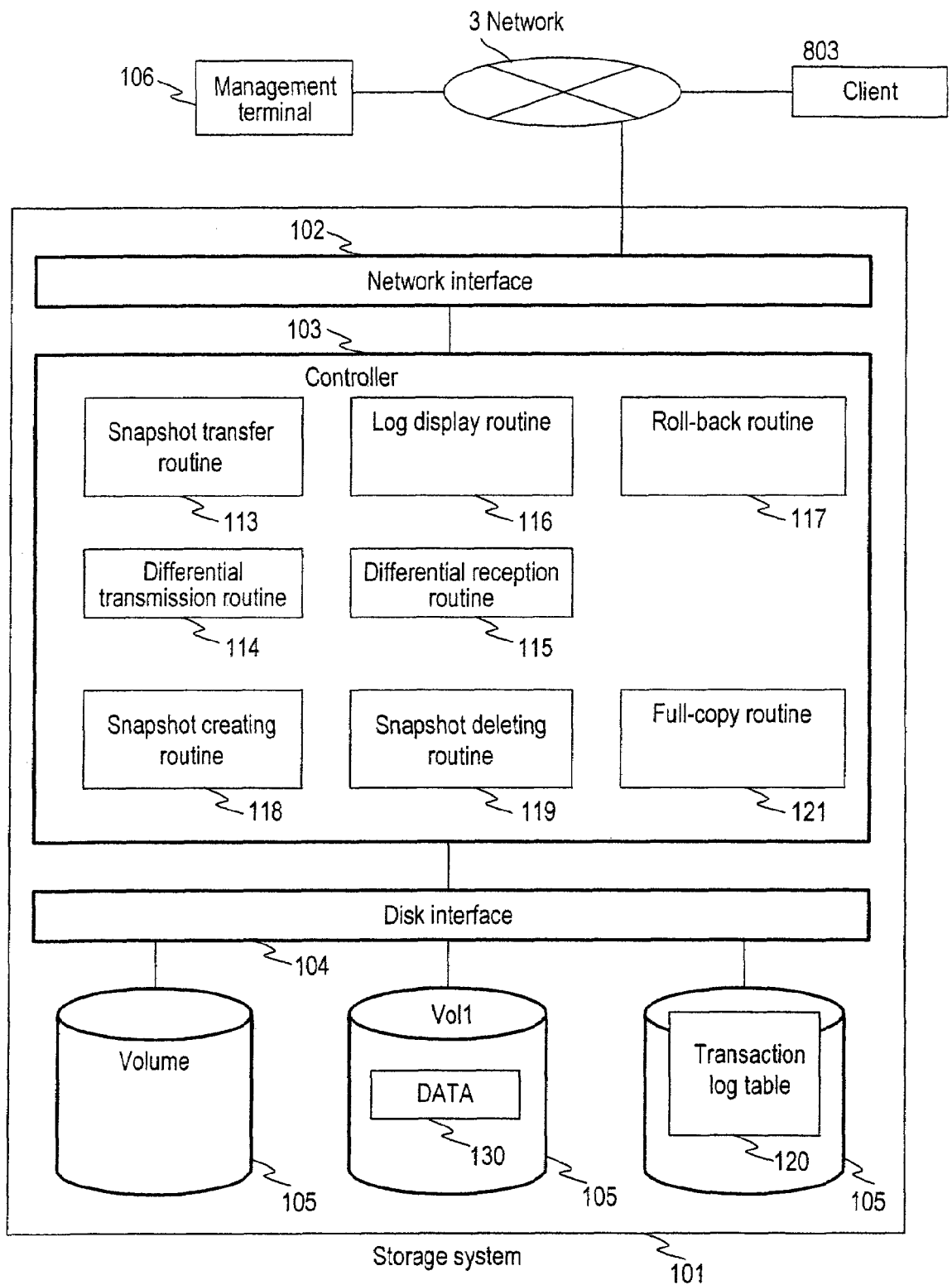
FIG. 2 is a function block diagram of a storage system.

FIG. 2 is a more detail internal structural diagram of the storage system 101. One of multiple volumes 105 includes a transaction log table 120 for storing a transfer log of snapshot. In the controller 103, multiple programs including the snapshot transfer routine 113, differential transmission routine 114, differential reception routine 115, log display routine 116, rollback routine 117, snapshot creating routine 118, snapshot deleting routine 119, and full copy routine 121 are executed by the CPU 1031.

The snapshot transfer routine 113 acquires, based on a command of the management terminal 106, the snapshot created by the snapshot creating routine 118 explained later, time and destination of the snapshot which will become the base data for differential transfer and then transfers these data to the differential transmission routine 114.

The differential transmission routine 114 creates difference of snapshot as the differential snapshot based on the information received from the snapshot transfer routine 113 and transmits the differential snapshot to the designated communication destination. Moreover, the differential transmission routine 114 updates the transaction log table 120 upon completion of transmission.

The differential reception routine 115 creates a snapshot based on the received differential snapshot and updates the transaction log table 120.

The log display routine 116 displays contents of the transaction log table 120 based on the command from the management terminal 106.

The rollback routine 117 executes rollback process of the snapshot explained later based on the command from the management terminal 106.

The snapshot creating routine 118 acquires, in the preset timing, the snapshot of the volume 105 (Vol. 1) storing the data 130 and stores this snapshot to the predetermined volume 105. As the predetermined timing, period or time such as every one hour or the like is designated. In addition, the snapshot creating routine 118 can create the snapshot whenever it is required based on the command from the management terminal 106.

The snapshot deleting routine 119 deletes the snapshots stored in the volume 105 based on the command from the management terminal 106. The full copy routine 121 acquires the snapshot of the volume 105 storing the data 130 which will become the base data for the differential transfer and transfers in direct this snapshot to the storage system 1011 at the secondary site 2.

Detail operations of each program will be explained below.

FIG. 3 illustrates a format of the transaction log table 120. Each entry of the transaction log table 120 comprises five fields, namely transfer time 201 for storing the transmitting (or receiving) time of the differential snapshot, class 202 indicating the direction of transmitting or receiving communication, volume name 203 for identifying the volume of snapshot, snapshot time 204 for storing time and day when the snapshot is created, and communication destination address 205 for storing the address of transmission destination or reception destination. For example, the first entry indicates that the snapshot of time 09:00 of the volume Vol. 1 has been transmitted completely to the communication destination address 10.0.0.2 (IP address at the secondary site 2) at the time of 09:02. The second entry indicates that the snapshot of time 09:00 of the volume Vol. 2 has been received completely from the communication destination address 10.0.0.2 at the time 09:05.

The controllers 103 in the primary site 1 and secondary site 2 administrate the history of differential data by adding a new entry to respective transaction log tables 120 every time the differential snapshot (differential data) is transmitted and received. In other words, the generation a snapshot corresponding to the transmitted and received differential data can be managed by referring to the transaction log table 120. As the volume name 203, an identifier of a volume can also be used as well as the name of a volume.

Figure 4:
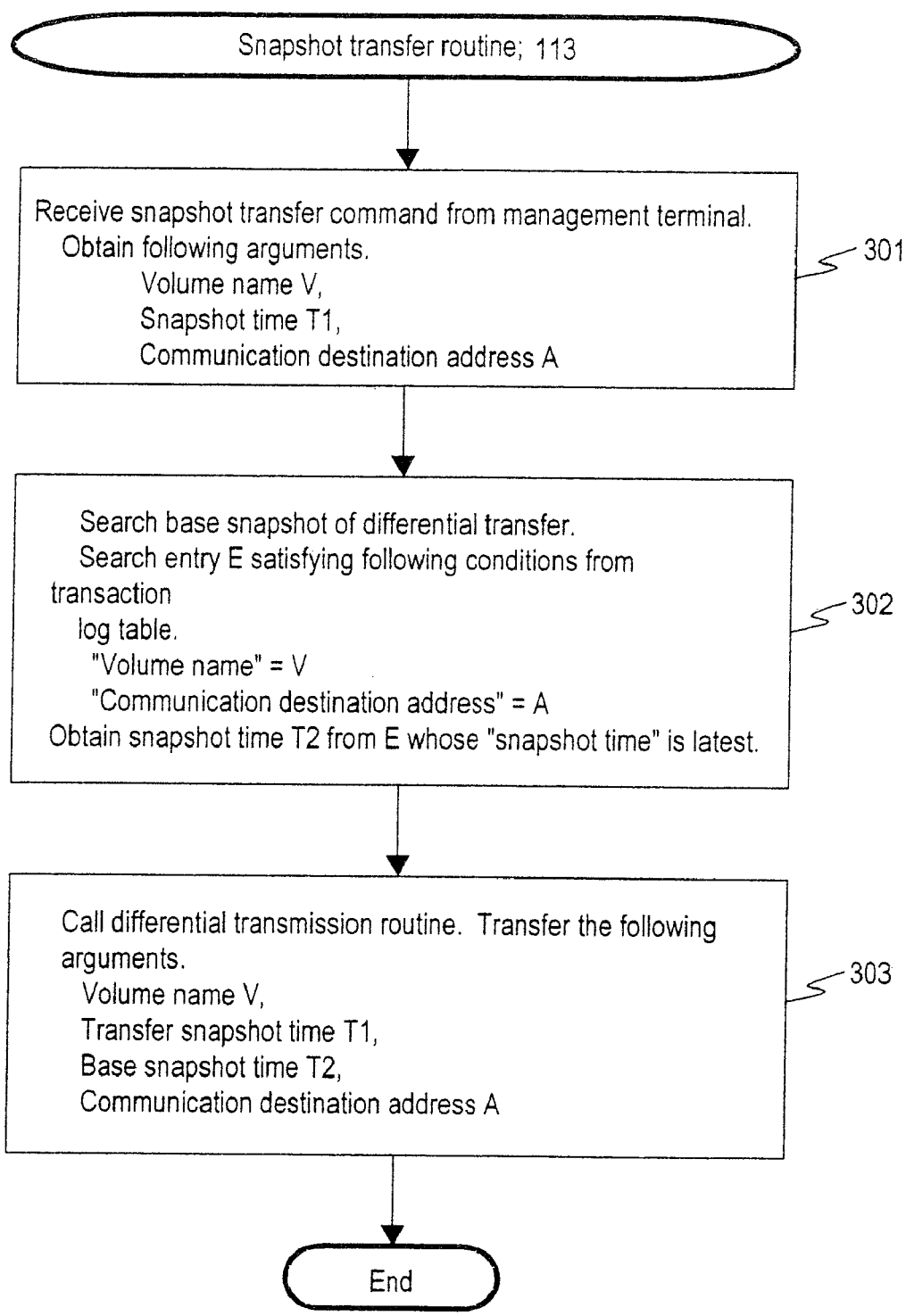
FIG. 4 is a flowchart illustrating an example of process executed in a snapshot transfer routine of the storage system.

FIG. 4 illustrates a flowchart of the snapshot transfer routine 113. In the step 301, a snapshot transfer command is received from the management terminal 106 and the volume name V, snapshot time T1, and communication destination address A are received as the argument. In the step 302, the entry E, in which the volume name field 203 is V, the communication destination address field 205 is A and the snapshot time field 204 is latest, is searched from the transaction log table 120 in order to obtain the snapshot which becomes the base data for differential transfer and a value T2 of the snapshot time field 204 is obtained from this entry E. In the step 303, the differential transmission routine 114 is called. At the time of calling, the volume name V, transfer snapshot time T1, base snapshot time T2, and communication destination address A are transferred as the argument.

Figure 5:
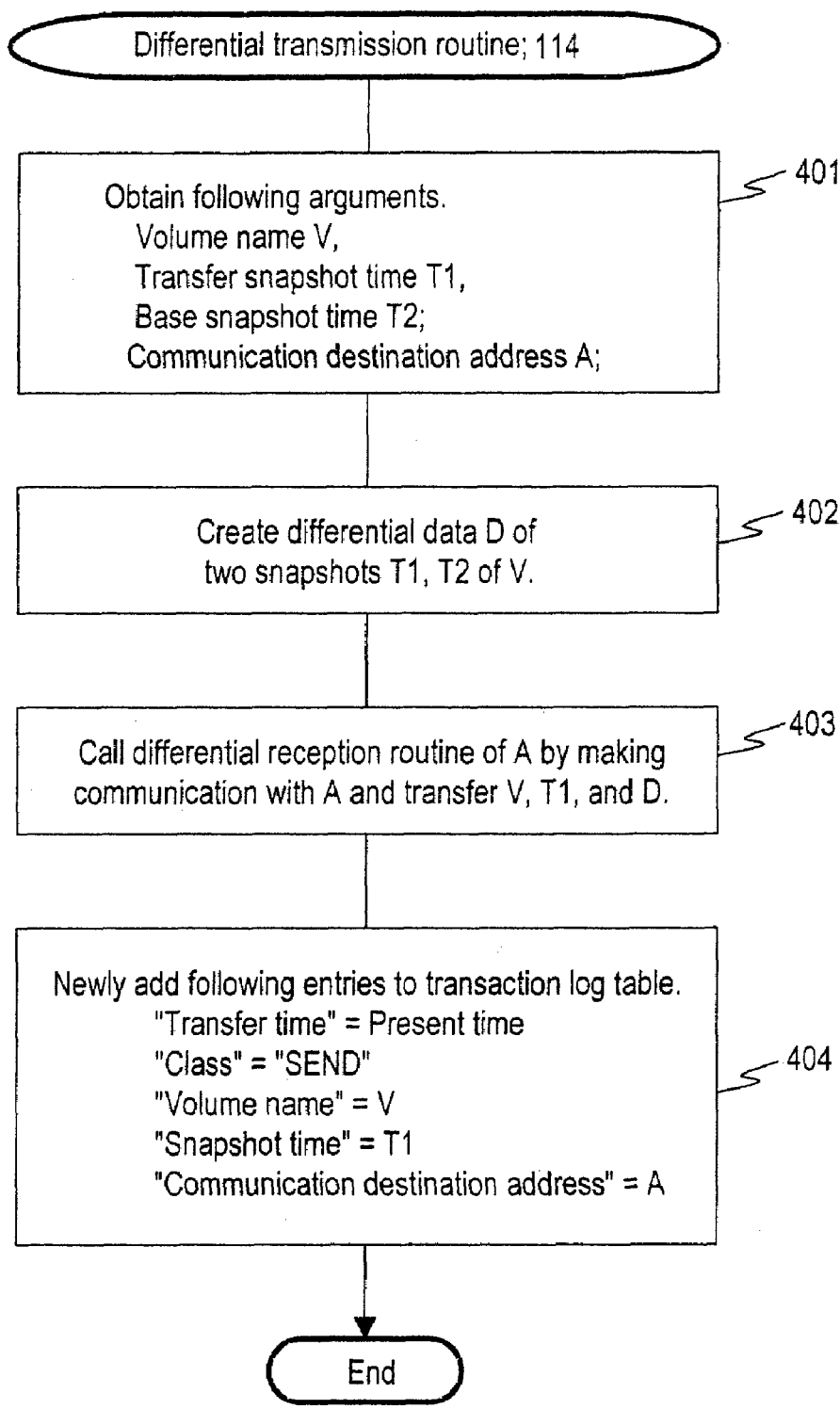
FIG. 5 is a flowchart illustrating an example of the process executed in a differential transmission routine of the storage system.

FIG. 5 illustrates a flowchart of the differential transmission routine 114. In the step 401, the volume name V, snapshot time T1, base snapshot time T2, and communication destination address A are obtained as the argument. In the step 402, a differential data (differential snapshot) D of the two snapshot times T1, T2 of the volume name V is created. In the step 403, the volume name V, snapshot time T1 and differential data D are transferred by calling the differential reception routine 115 of the communication destination address A through communication with the storage system of the communication destination address A. In the step 404, a new entry is added to the transaction log table 120. A value of each field of the entry is specified as follow. A value of the transfer time field 201 is the present time, a value of the class field 202 is "SEND", a value of the volume name field 203 is V, a value of the snapshot time field 204 is T1, and a value of the communication destination address field 205 is A.

Figure 6:
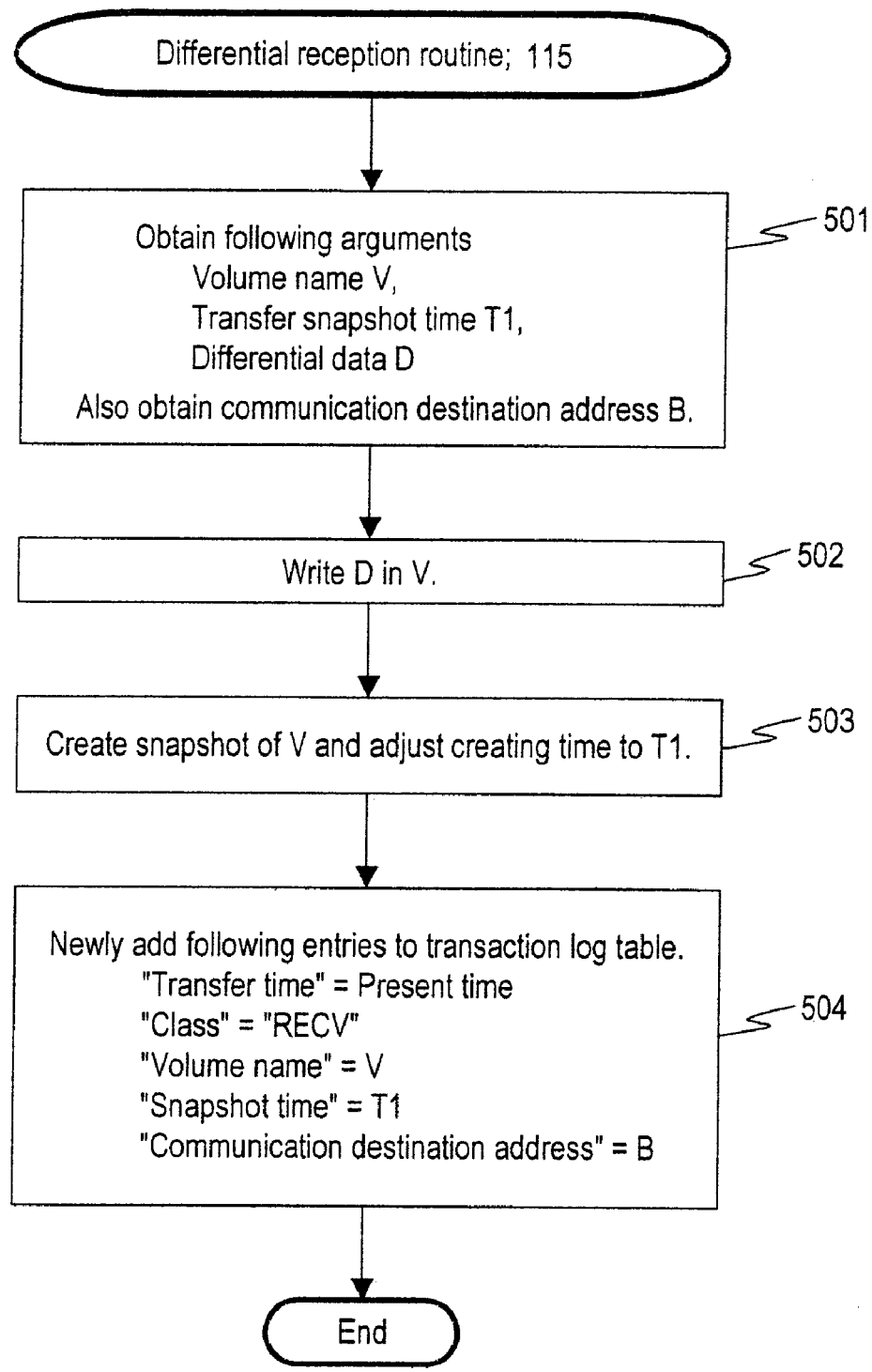
FIG. 6 is a flowchart illustrating an example of the process executed in a differential receiving routine of the storage system.

FIG. 6 illustrates a flowchart of the differential reception routine 115. In the step 501, the volume name V, transfer snapshot time T1, and differential data D are obtained as the argument. Moreover, the address B of the communication destination is also obtained. In the step 502, the differential data D is entered to the volume name V. With this process, content of the volume 105 having received the differential data D is synchronized with the volume 105 of the transmitting source. In the step 503, the snapshot of the volume name V is newly created and the creating time of the snapshot is adjusted to T1. In the step 504, a new entry is added to the transaction log table 120. A value of each field of the newly added entry is as follows. Namely, a value of the transfer time field 201 is the present time, a value of the class field 202 is "RECV", a value of the volume name field 203 is V, a value of the snapshot time field 204 is T1, and a value of the communication destination address 205 is B.

A series of processes illustrated in FIG. 4 to FIG. 6 becomes the differential copy process to be explained later. Accordingly, a differential snapshot of the volume 105 in the primary site 1 is transferred to the storage system 1011 in the secondary site 2, contents of volumes 105 in the primary site 1 and secondary site 2 are synchronized, and the snapshots of the same time are stored.

Figure 7:
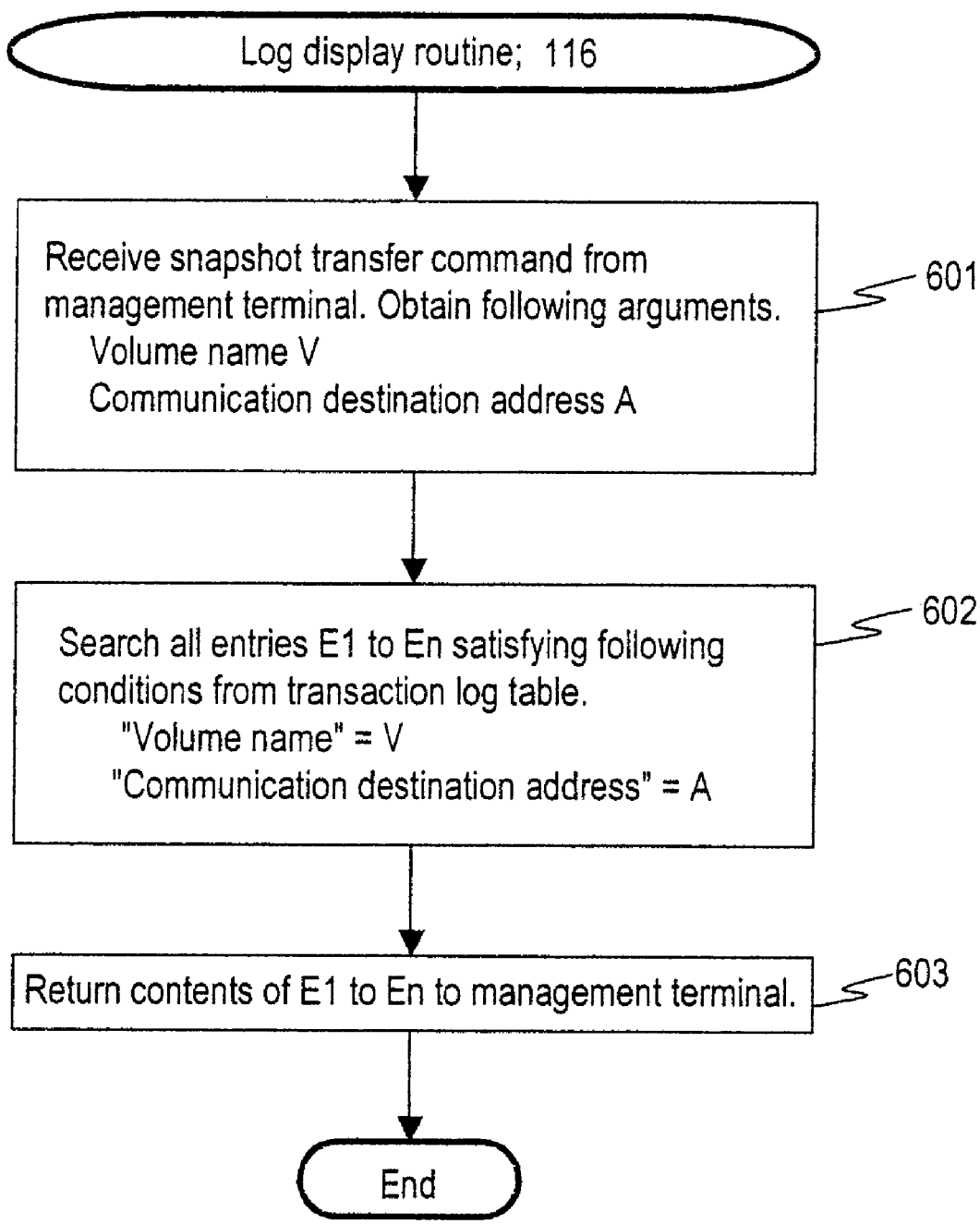
FIG. 7 is a flowchart illustrating an example of process executed in a log display routine of the storage system.

FIG. 7 illustrates a flowchart of the log display routine 116. In the step 601, a snapshot transfer command is received from the management terminal 106. As the argument, volume name V and communication destination address A are obtained. In the step 602, the entries E1 to En, wherein the volume name field 203 is V and communication destination address field 205 is A, are all searched from the transaction log table 120. In the step 603, the searched entries E1 to En are all returned to the management terminal 106. The management terminal 106 displays the entries E1 to En received from the storage system 101.

Figure 8:
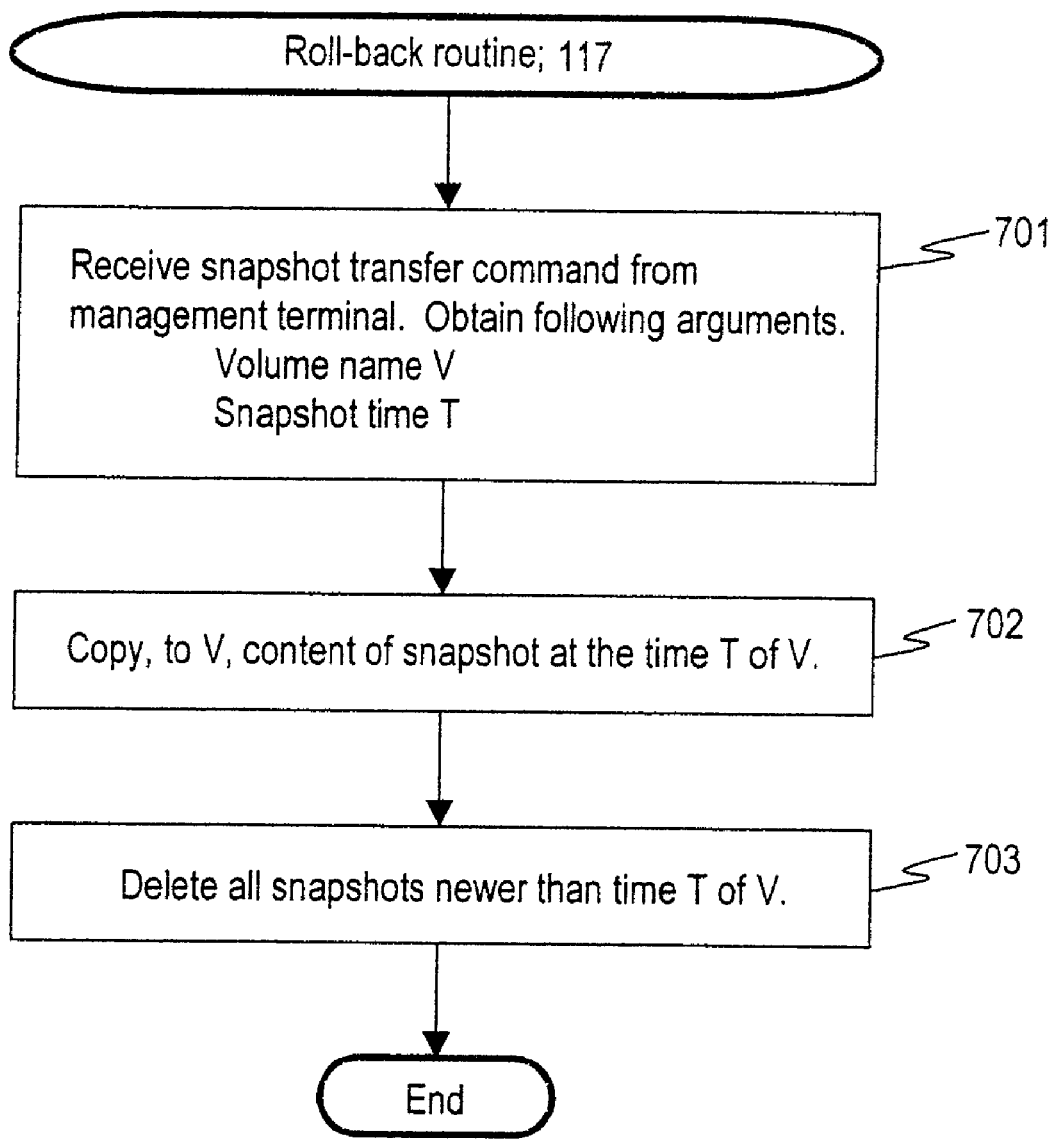
FIG. 8 is a flowchart illustrating an example of the process executed in a rollback routine of the storage.

FIG. 8 illustrates a flowchart of the rollback routine 117. In the step 701, a snapshot transfer command is received from the management terminal 106. As the argument, the volume name V and snapshot time T are obtained. In the step 702, content of snapshot at the time T of the volume name V is copied to the volume V. In the step 703, new snapshots at the time T of the volume V are all deleted.

Figure 9:
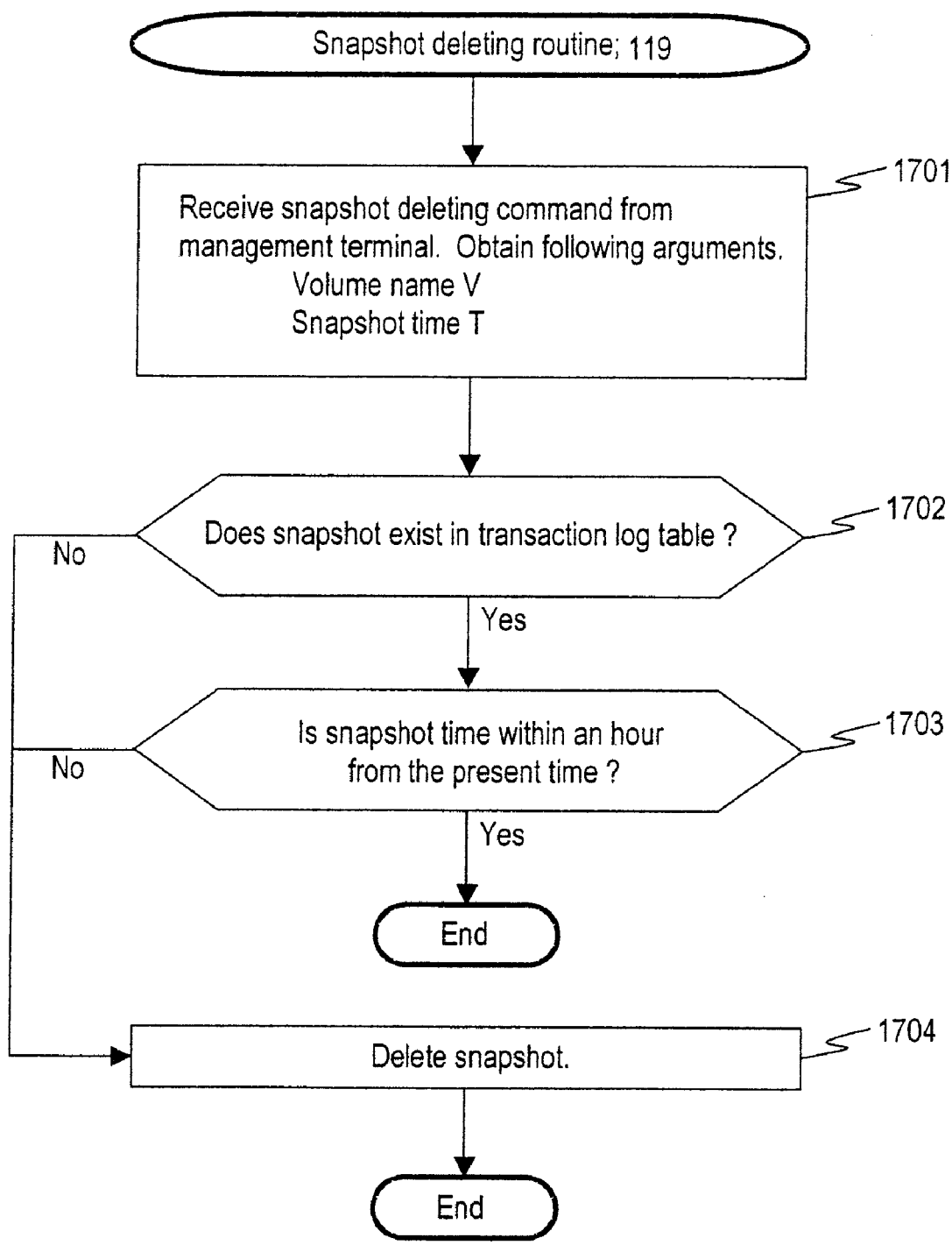
FIG. 9 is a flowchart illustrating an example of the process executed in a snapshot deleting routine of the storage system.

FIG. 9 illustrates a flowchart of the snapshot deleting routine 119. In the step 1701, a snapshot deleting command is received from the management terminal 106. As the argument, the volume name V and snapshot time T are obtained. In the step 1702, whether the transfer log of the snapshot at the time T of the volume V exists or not in the transaction log table 120 is decided. When the transfer log exists, the process moves to the step 1703. If the transfer log does not exist, the process moves to the step 1704. In the step 1703, whether the snapshot time T is within an hour from the present time or not is decided. When the snapshot time T is within an hour, the process is completed. If the snapshot time T is not within an hour, the process moves to the step 1704. In the step 1704, the snapshot and transfer log are deleted. With this process, the snapshot and transfer log, which have passed the predetermined period (e.g., an hour) from the creation time, can be deleted based on the command from the management terminal 106. The snapshot and transfer log within an hour from the creation time have the possibility for use. Therefore, if the deleting command is received from the management terminal 106, the deleting process is rejected.

The snapshot deleting routine 119 is executed periodically (keeping the predetermined period) respectively in the storage system 101 at the primary site 1 and the storage system 1011 at the secondary site 2, namely executed, e.g., every one hour.

Details of the storage system 101 (1011) have been explained above. Next, a flow of the remote copy operation using the storage systems 101, 1011 will then be explained and evaluation of method for rollback from a snapshot to a volume with log in such operation will be explained. The operation scenario used in the explanation is as follows.

Figure 10:
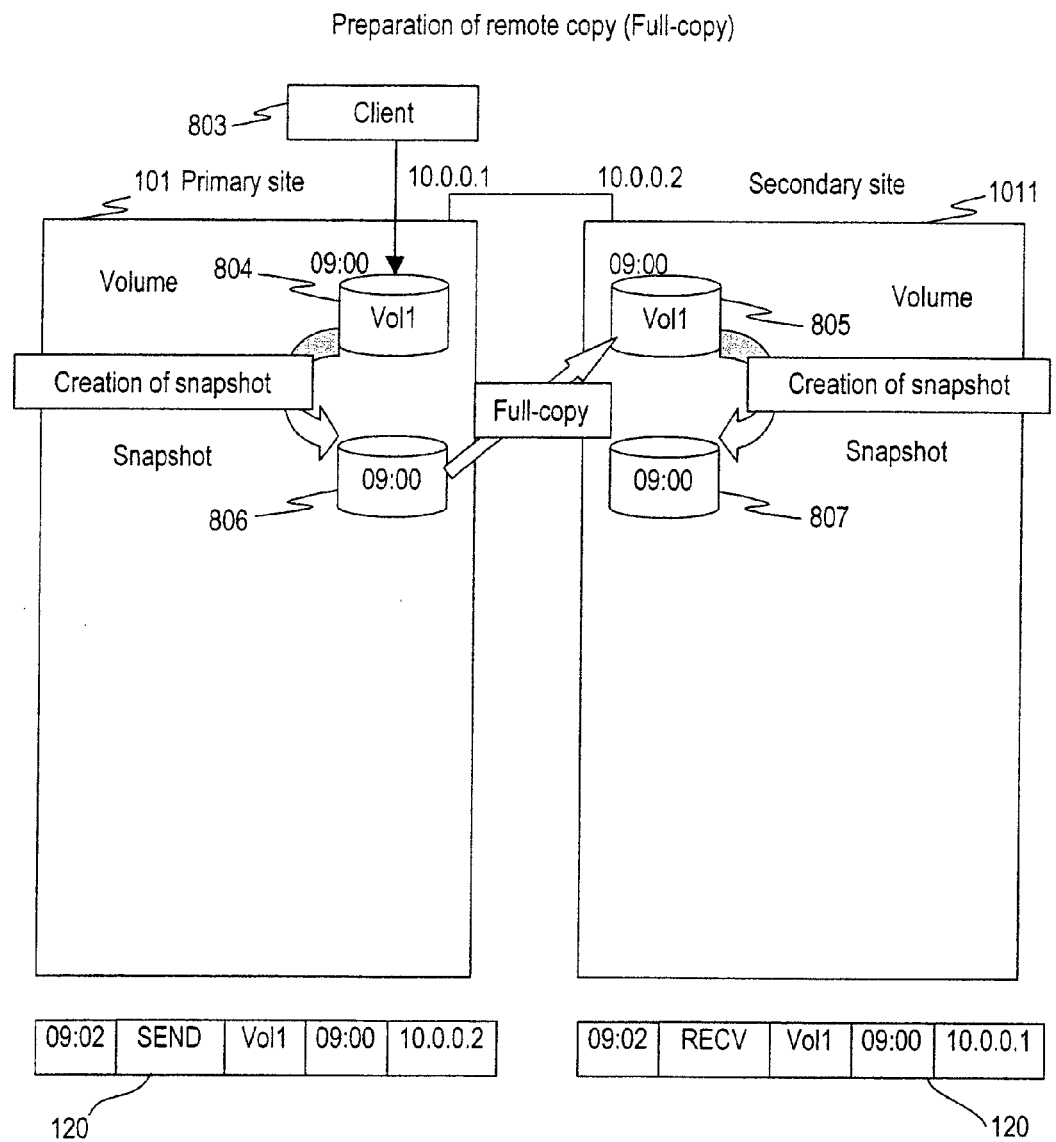
FIG. 10 is an explanatory diagram of a computer system illustrating a flow of preparation for remote copy.
Figure 11:
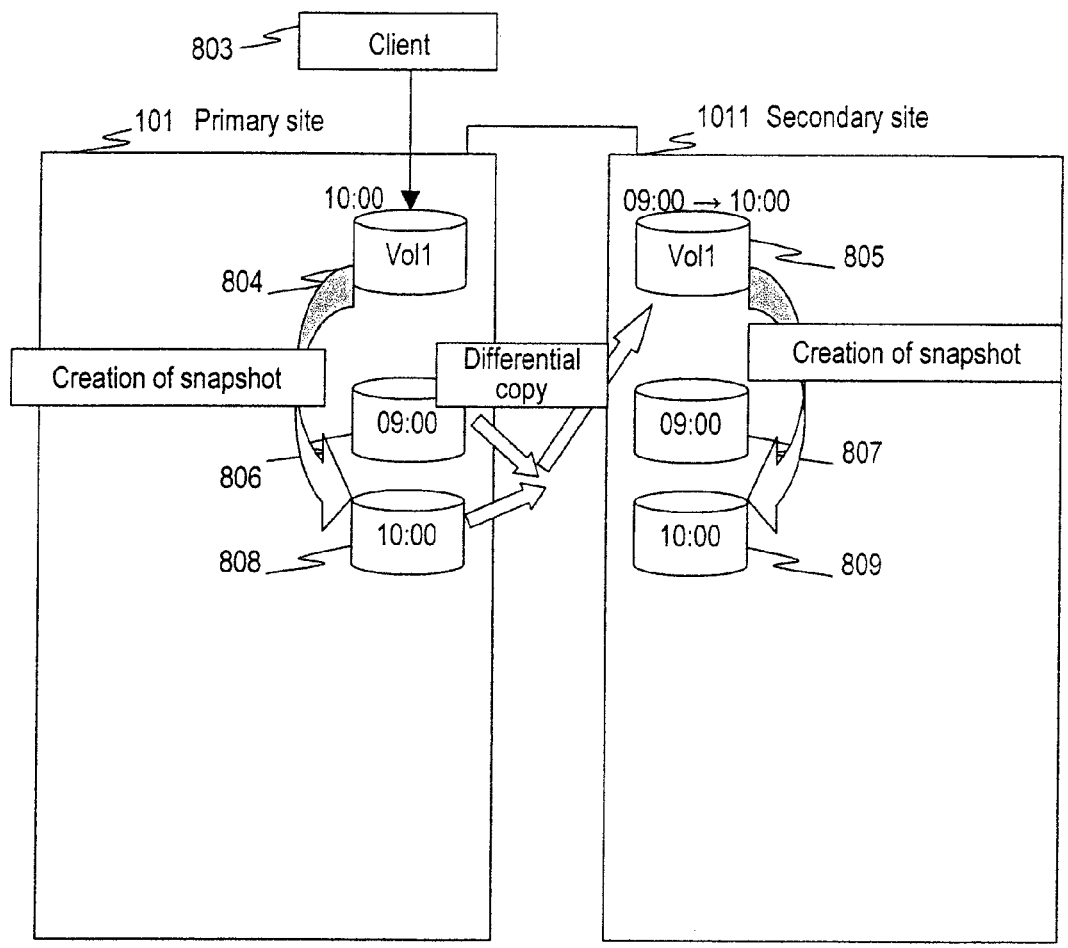
FIG. 11 is an explanatory diagram of the computer system illustrating a flow of remote copy.
Figure 12:
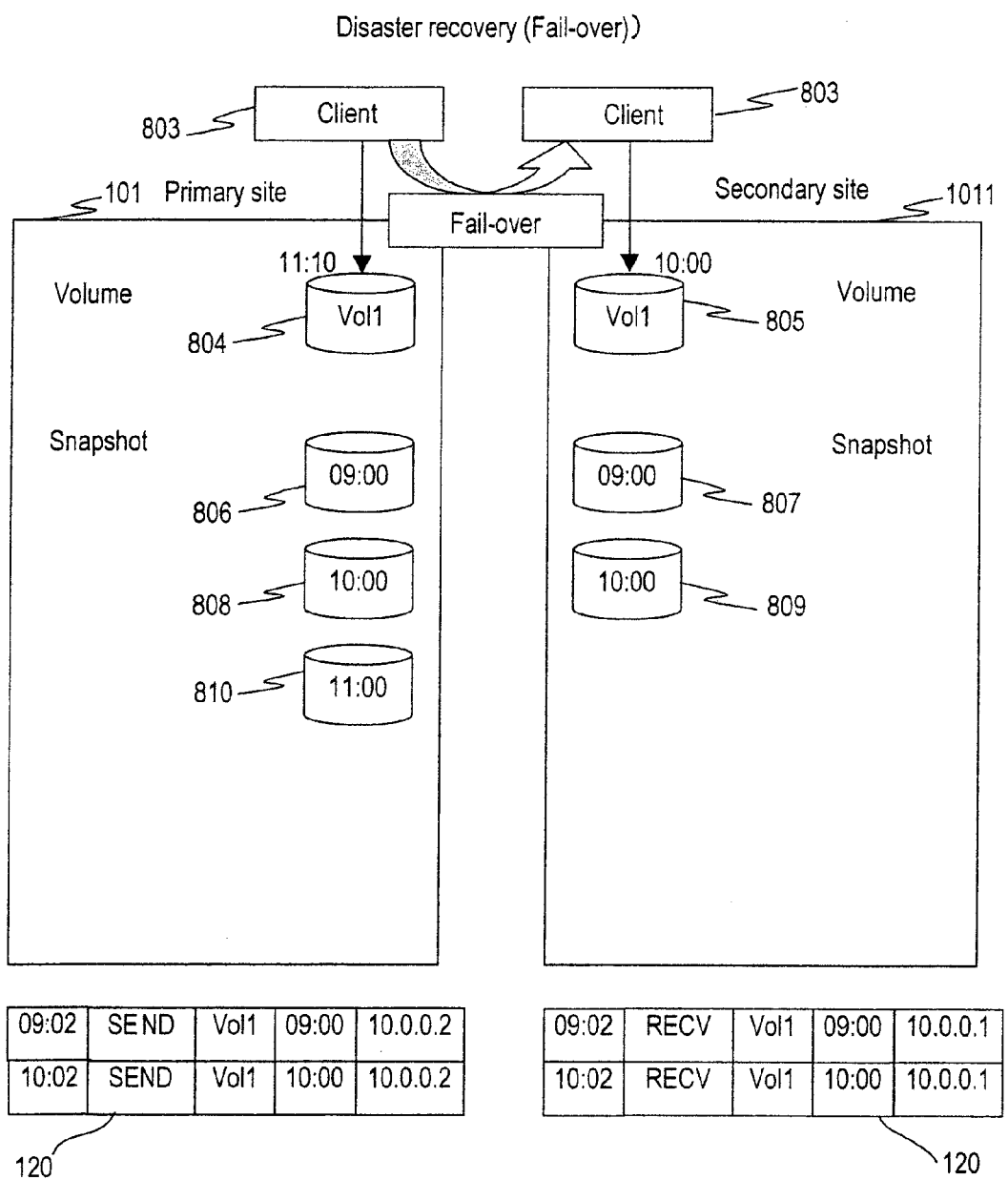
FIG. 12 is an explanatory diagram of the computer system illustrating a flow of fail-over.
Figure 13:
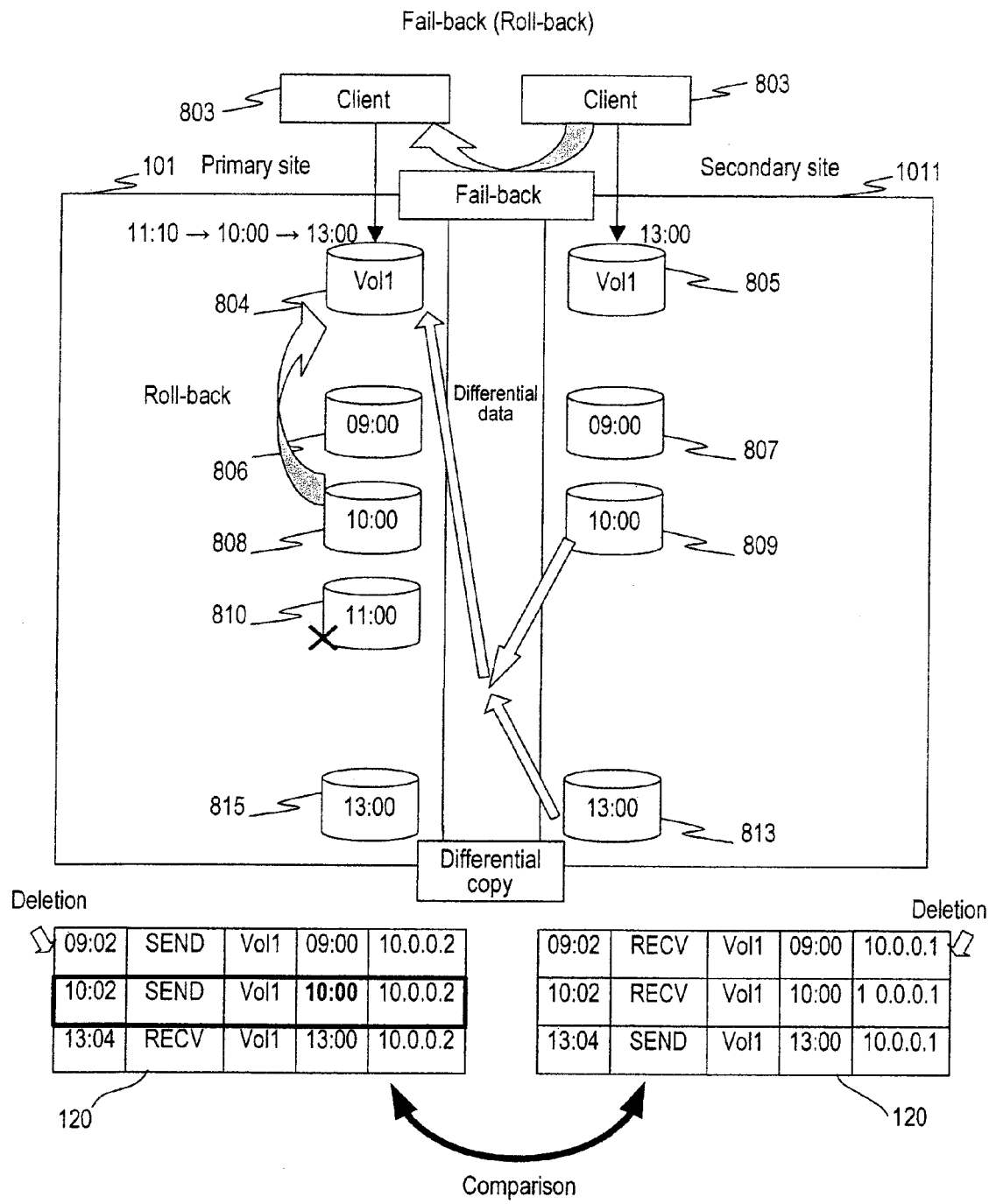
FIG. 13 is an explanatory diagram of the computer system illustrating a flow of fail-back.

First, preparation for remote copy is set up at the time 9:00 (FIG. 10). Next, the remote copy operation is performed up to the time 11:09 from 9:01. During this process, differential copy process to be executed periodically (e.g., in every hour) is generated at the time 10:00 (FIG. 11). Here, a failure occurs in the primary site 1 at the time 11:10 and the secondary site 2 takes over as primary site 1. Namely, a disaster recovery is generated (FIG. 12). Finally, after the primary site 1 is recovered, the data at the secondary site 2 is restored to the primary site 1 and the primary site 1 takes over as secondary site 2 and the primary site starts the remote copy operation from the primary site 1 to the secondary site 2. Namely, the fail-back (rollback) process is generated (FIG. 13).

FIG. 10 illustrates a flow of preparation of the remote copy (full-copy process) at the time 9:00. Two storage systems 101, 1011 are connected with the network 3 and the storage system in the copying source is defined as the storage system 101 at the primary site 1, while the storage system in the copying destination as the storage system 1011 at the secondary site 2. In the primary site 1, a volume 804 (Vol 1) is used from a client 803. Namely, the volume 804 becomes the operation volume. Content of the volume 804 in the primary site 1 is remotely copied to a volume 805 (Vol 1) at the secondary site 2 with three procedures explained below. The volumes 804, 805 are volumes 105 illustrated in FIG. 1 and FIG. 2. In the following explanation of procedures, the reference numbers are changed. The snapshots created are stored to the predetermined volumes of the storage systems 101, 1011.

First, a primary site administrator instructs creation of a snapshot 806 of a volume 804 from the management terminal 106 and the snapshot creation routine 118 of the storage system 101 creates the snapshot 806 at the time 9:00 of the volume 804 (Vol 1). Next, the primary site administrator instructs full-copy to the storage system 101 from the management terminal 106. A controller 103 of the storage system 101 drives the full-copy routine 121, transfers all contents of the snapshot 806 from the primary site 1 to the secondary site 2, and writes these contents to the volume 805 at the secondary site 2. Finally, a secondary site administrator instructs creation of snapshot to the storage system 1011 from the management terminal 106. The snapshot creating routine 118 of the storage system 1011 in the secondary site 2 is driven to create the snapshot 807 of the volume 805 to which the contents are written. When this procedure is completed, both primary and secondary sites have the common snapshots 806, 807 at the time 9:00, contents of the volume 805 at the secondary site 2 correspond to that at the time 9:00 and are synchronized with the volume 804 of the primary site.

Since the full-copy is conducted first as explained above, the snapshots 806, 807 which are common to the primary and secondary sites can be obtained. Accordingly, the remote copy operation based on the differential copy using the common snapshots 806, 807 can be implemented subsequently. The controllers 103 in the primary and secondary sites previously write results of transmission and reception to the respective transaction log tables 120. Here, the IP address of the storage system 101 at the primary site 1 is assumed as 10.0.0.1, while the IP address of the storage system 1011 at the secondary site 2 is assumed as 10.0.0.2.

FIG. 11 illustrates a flow of remote copy operation at the time 10:00. In the primary site 1, the snapshot creating routine 118 and snapshot transfer routine 113 are driven every hour to periodically execute the remote copy process. This remote copy process copies differential data of the content (snapshot) of the volume 804 at the primary site 1 to the volume 805 at the secondary site 2 with the two procedures explained below. This copy is defined as the differential copy. In this copy process, the differential data of snapshot is transmitted with addition of the volume name.

First, in the primary site 1, the snapshot creating routine 118 creates a snapshot 808 of the volume 804 at the time 10:00. Next, in the primary site 1, the snapshot transfer routine 113 is activated. This snapshot transfer routine 113 can be activated, e.g., in the timing when creation of the snapshot is completed in the snapshot creating routine 118.

The snapshot transfer routine 113 refers to the transaction log table 120, identifies the snapshot 806 just before the snapshot becomes the base of the differential transfer, creates the differential data between the base snapshot 806 and the designated snapshot 808, and transmits this differential data to the secondary site 2. The storage system 1011 in the secondary site 2 writes the received differential data to the volume 805 to synchronize content of the volume 805 to the content of volume 804 at the primary site 1 at the time 10:00. Next, the storage system 1011 at the secondary site 2 creates the snapshot 809 of the volume 805. Moreover, the storage system 1011 at the secondary site 2 stores history of reception by adding new entries to the transaction log table 120 at the secondary site 2.

When this procedure is completed, the contents of the volume 805 corresponds to that at the time 10:00 and two snapshots at the time 9:00 and 10:00 can be obtained as the common snapshots of the two sites. The differential copy can be conducted by defining the common snapshots as the snapshot as the start timing as explained above. If the differential copy becomes impossible, the common snapshot cannot be deleted. However, the common snapshot can be updated to the new snapshot sequentially by periodically conducting the differential copies. Therefore, the unwanted volume region can be released by deleting the old common snapshots. It should be noted here that the volume 805 must be matched with the common snapshot 809 in the differential copying destination, namely, at the secondary site 2 in this case. For example, if the volume 805 is individually updated in the secondary site 2, the differential copy is no longer implemented. This is the essential condition for the differential copy.

FIG. 12 illustrates a flow of disaster recovery (fail-over) at the time 11:10. At the time 11:10, a snapshot 810 is created in the primary site 1. However, the differential copy to the secondary site 2 fails due to a failure generated in the communication link (network 3). Therefore, the secondary site 2 abandons update of data generated in the primary site 1 at the time 10:00 to 11:10 and the secondary site 2 takes over as primary site 1 to continues the business, namely performs fail-over using the data at the time 10:00 as the latest snapshot, that is, using the volume 805.

More specifically, the administrator of the primary site 1 makes communication with the administrator of the secondary site 2 using the communication means such as the telephone not using the network 3. The administrator of the primary site 1 instructs stoppage of business of the client 803 at the primary site 1 from the management terminal 106 or the like. The administrator of the secondary site 2 notifies that it has taken over the business to the client 803 from the management terminal or the like of the secondary site 2. Successively, the client 803 can make access to the volume 805 duplicated in the storage system 1011 at the secondary site 2.

In this timing, two snapshots at the time of 09:00 and 10:00 are attained as the common snapshots in the primary and secondary sites. The snapshots after the time 10:00 are updated individually in the primary site 1 and secondary site 2.

FIG. 13 illustrates a flow of fail-back (rollback) at the time 13:00. Since the secondary site 2 is creating the snapshots periodically (e.g., in every hour), three snapshots are existing in this timing because the snapshot 813 at the time 13:00 are added. Moreover, the volume 805 at the primary site 1 is in the state at the time 11:10 of disaster recovery where a failure occurs in the network 3. When the fail-back process is started, three snapshots 806, 808, and 810 exist in the figure.

Here, in the fail-back process, the updated data in the secondary site 2 up to the fail-back time 13:00 from the fail-over time 11:10 are restored to the primary site 1, the business is returned from the secondary site 2 to the primary site 1, and the remote copy operation from the primary site 1 to the secondary site 2 can be restarted.

In order to minimize stoppage of service during this fail-back process, continuation of updated data of the main service 1 from the secondary site 2 is conducted with the differential copy in place of the full-copy. For restoring of the data at the secondary site 2 to the primary site 1, the latest snapshot must be selected from the common snapshot both in the primary site 1 and the secondary site 2. Accordingly, the administrator drives the log display routine 116 of FIG. 7 from the management terminal 106 to acquire the transaction log table 120 at the secondary site 2 and that at the primary site 1 and compares these transaction table 120 as illustrated in the lower side of FIG. 12. The snapshot of the latest snapshot time of the same volume name can be extracted from the two transaction log tables 120.

In FIG. 12 (at the time 13:00 in FIG. 13), the latest snapshots 808 and 809 at the time up to 10:00 are attained as the common snapshots in both primary and secondary sites. Namely, synchronization point can be implemented by comparing the transfer logs of the snapshots.

According to the essential condition for the differential copy described above, the volume 805 must be matched with the snapshot 808 in the differential copy destination, that is, in the primary site 1 in this case. Therefore, the administrator of the primary site 1 sends first a command to the storage system 101 from the management terminal 106 to conduct the rollback process with the snapshot 808 at the time 10:00 and deletes the individual updated data (snapshot 810 at the time 10:00 to 11.10) at the primary site 1. Accordingly, contents of the volumes 804, 806 of the storage systems 101, 1011 in the primary site 1 and secondary site 2 are synchronized with that at the time 10:00 and thereby the latest snapshot is also synchronized with the snapshots 808, 809 at the time 10:00. Next, the administrator of secondary site 2 instructs, from the management terminal 106 or the like, the storage system 1011 to the primary site 1 to conduct the differential copy of the individual updated data at the secondary site 2 (updated data during the fail-over period at the time 11:10 to 13:00).

First, the administrator of the primary site 1 instructs the storage system 101, from the management terminal 106 or the like, to drive the rollback routine 117 by designating the snapshot 808 at the time 10:00. Thereby, in the rollback routine 117, content of the snapshot 808 at the time 10:00 is copied to the volume 804 in the primary site 1. In this timing, content of the volume 804 is returned to that at the time 10:00. Moreover, in the step 703 of the rollback routine 117, the snapshots after the specified time 10:00 are deleted. In this case, the snapshot 810 at the time 11:00 is deleted.

Next, the administrator of the secondary site 2 drives the snapshot transfer routine 113 from the management terminal 106 or the like. Therefore, in the secondary site 2, the snapshot transfer routine 113 creates the snapshot 813 at the time 13:00 and the differential data to the snapshot 809 at the time 10.00 which is the just preceding snapshot is copied to the primary site 1.

The storage system 101 at the primary site 1 writes the received differential data to the volume 804 in the differential reception routine 115 and synchronizes content of the volume 804 with that at the same time 13:00 of the volume 805 in the secondary site 2. Thereafter, the differential reception routine 115 of the storage system 101 in the primary site 1 creates the snapshot 815 of the volume 804 and synchronizes with the snapshot 813 at the secondary site 2 at the same time 13:00.

As explained above, when continuation (fail-back process) of the volume and snapshot from the secondary site 2 to the primary site 1 is completed as explained above, the administrator of the secondary site 2 instructs the storage system 1011, from the management terminal 106 or the like, to unmount the volume 805 and the administrator of the primary site 1 instructs the storage system 101 at the primary site 1 to mount the volume 804. The administrator of the primary site 1 notifies, to the client 803 from the management terminal 106 or the like, continuation of the business from the secondary site 2 to the primary site 1 and updates the access destination of the client 803. Moreover, the primary site 1 executes the snapshot creating routine 118 in the predetermined period and also restarts the remote copy operation from the primary site 1 to the secondary site 2.

The system configuration and processing flows in this embodiment have been explained above. According to this embodiment, when the transaction log tables 120 of the corresponding volumes at the primary site 1 and secondary site 2 are acquired in the fail-back after disaster recovery when the data in the primary site 1 is protected safely, it is no longer required to search the generation of the snapshots through previous communication between the primary site 1 and the secondary site 2 as in the case of the related art and thereby high speed differential copy can be implemented. Therefore, high speed failure recovery process can also be implemented by remarkably reducing the non-service period during the fail-back process.

Here, the predetermined number of logs, e.g., three logs can be stored to the transaction log table 120. In this case, when the number of entries of the transaction log table 120 exceeds the predetermined number, the controller 103 of the storage system 101 drives the snapshot deleting routine 119 and the primary site 1 in FIG. 13 deletes the oldest log at the time 09:02 before the data is entered to the log at the time 13:04. Moreover, the secondary site 2 also deletes the oldest log at the time 09:02 before it writes the data to the log at the time 13:04.

The size of transaction log table 120 can be reduced by limiting the number of entries of the transaction log table 120 and thereby generations of the snapshots used for the restore process in the fail-back process can be compared quickly. That is, high speed restore process from the secondary site 2 to the primary site 1 can be implemented by reducing amount of preceding communications in the restore process.

When primary site 1 can be used before the time 13:00 to start the fail-back in the first embodiment, the secondary site 2 may transmit the differential data of the snapshots of the volume 805 to the primary site 1. In other words, when the primary site 1 is capable of functioning as the remote copy destination of the secondary site 2, the secondary site 2 transmits, e.g., the snapshot of the volume 805 at the time 12:00 to the primary site 1. The primary site 1 applies the snapshot at the time 12:00 to the volume 804. On the occasion of the fail-back at the time 13:00, the secondary site 2 and the primary site 1 are synchronized at the time 12:00. Accordingly, when the secondary site 2 transmits the snapshot at the time 13:00 of the volume 805 to the primary site 1, it is enough for the secondary site 2 to transmit the differential data at the times 13:00 and 12:00. Therefore, high speed fail-back process can be implemented by reducing the amount of data for the communications.

Second Embodiment

Figure 14:
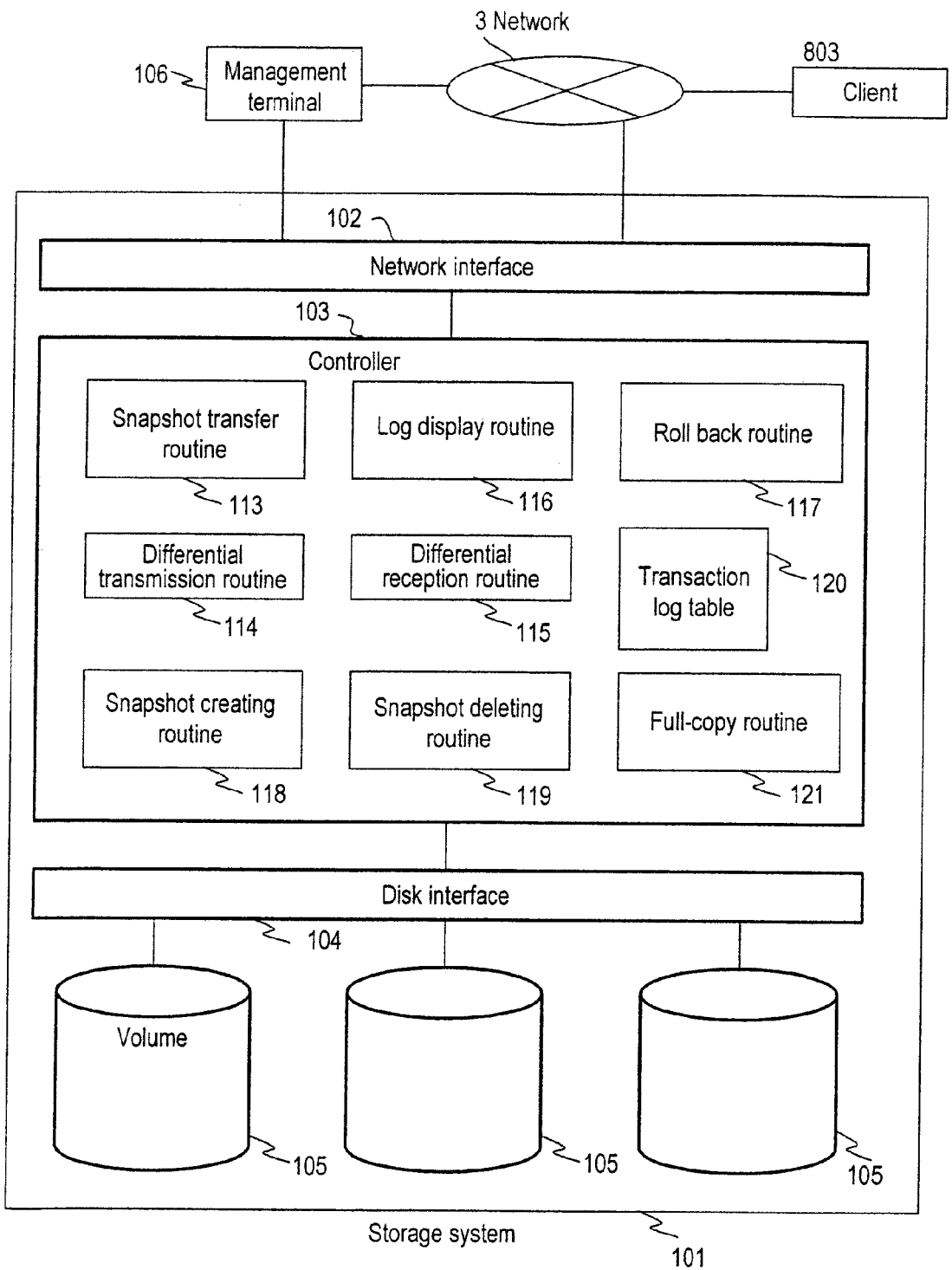
FIG. 14 is a block diagram of the computer system as a second embodiment of this invention.

FIG. 14 is a block diagram of the system as a second embodiment of this invention. This embodiment is different in the point that the transaction log table 120 is not stored in the volume 105 but to the memory 1032 of the controller 103.

An object of this embodiment is to enhance the performance of the remote copy by allocating the transaction log table 120 to the area ensuring high speed read and write operations.

Third Embodiment

Figure 15:
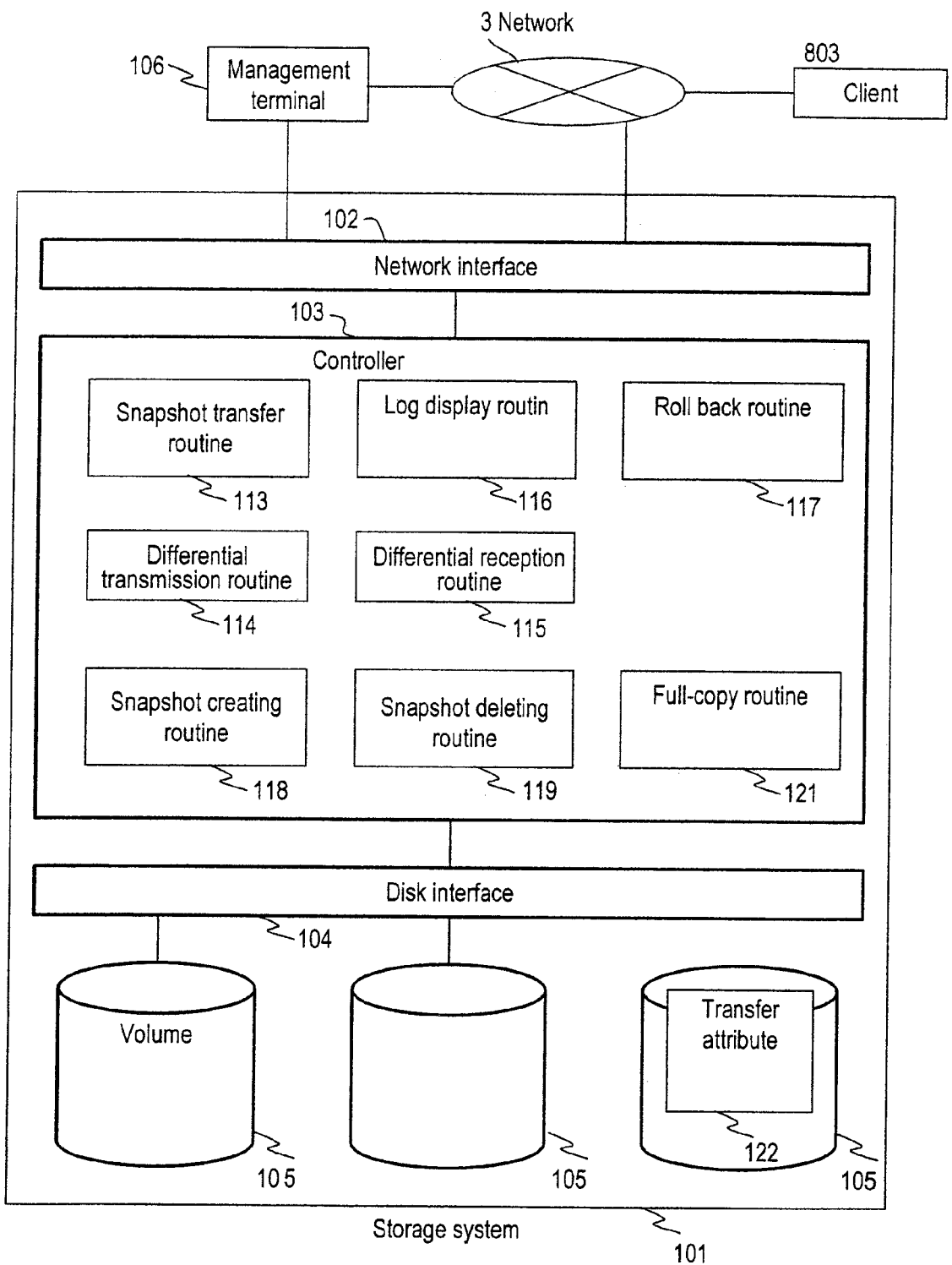
FIG. 15 is a block diagram of the computer system as a third embodiment of this invention.

FIG. 15 is a block diagram of the system as a third embodiment of this invention. This embodiment is different in the point that the transmission and reception history of differential data of the snapshot is not added to the transaction log table 120 but to the transfer attribute 122 of snapshot.

An object of this embodiment is to enhance the remote copy performance by allocating transmission and reception histories of snapshots to the area ensuring high speed read and write operations and to reduce the size of transaction log table 120 because transmission and reception history of the snapshot is also deleted when the snapshot is deleted.

Fourth Embodiment

Figure 16:
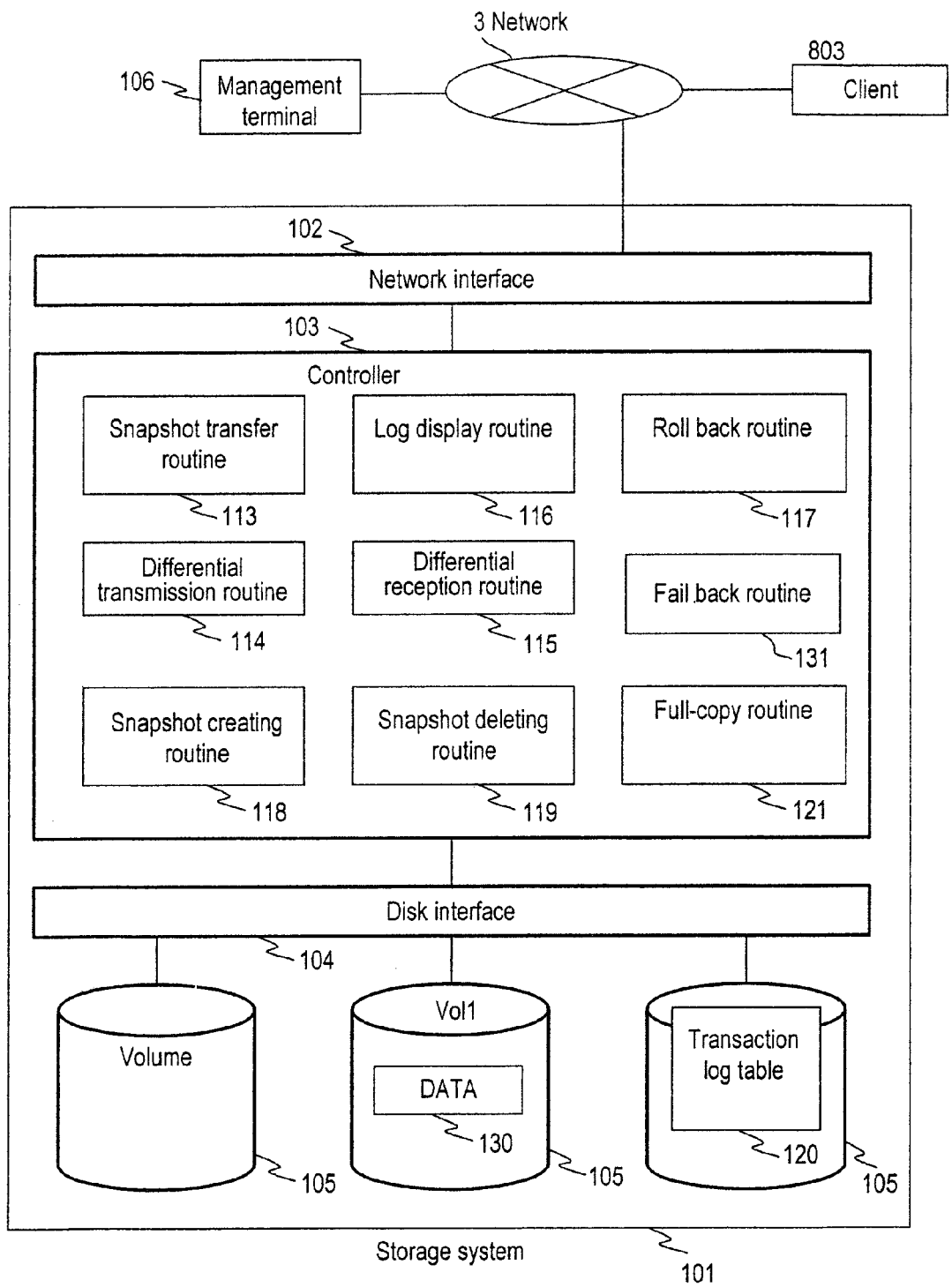
FIG. 16 is a block diagram of the computer system as a fourth embodiment of this invention.
Figure 17:
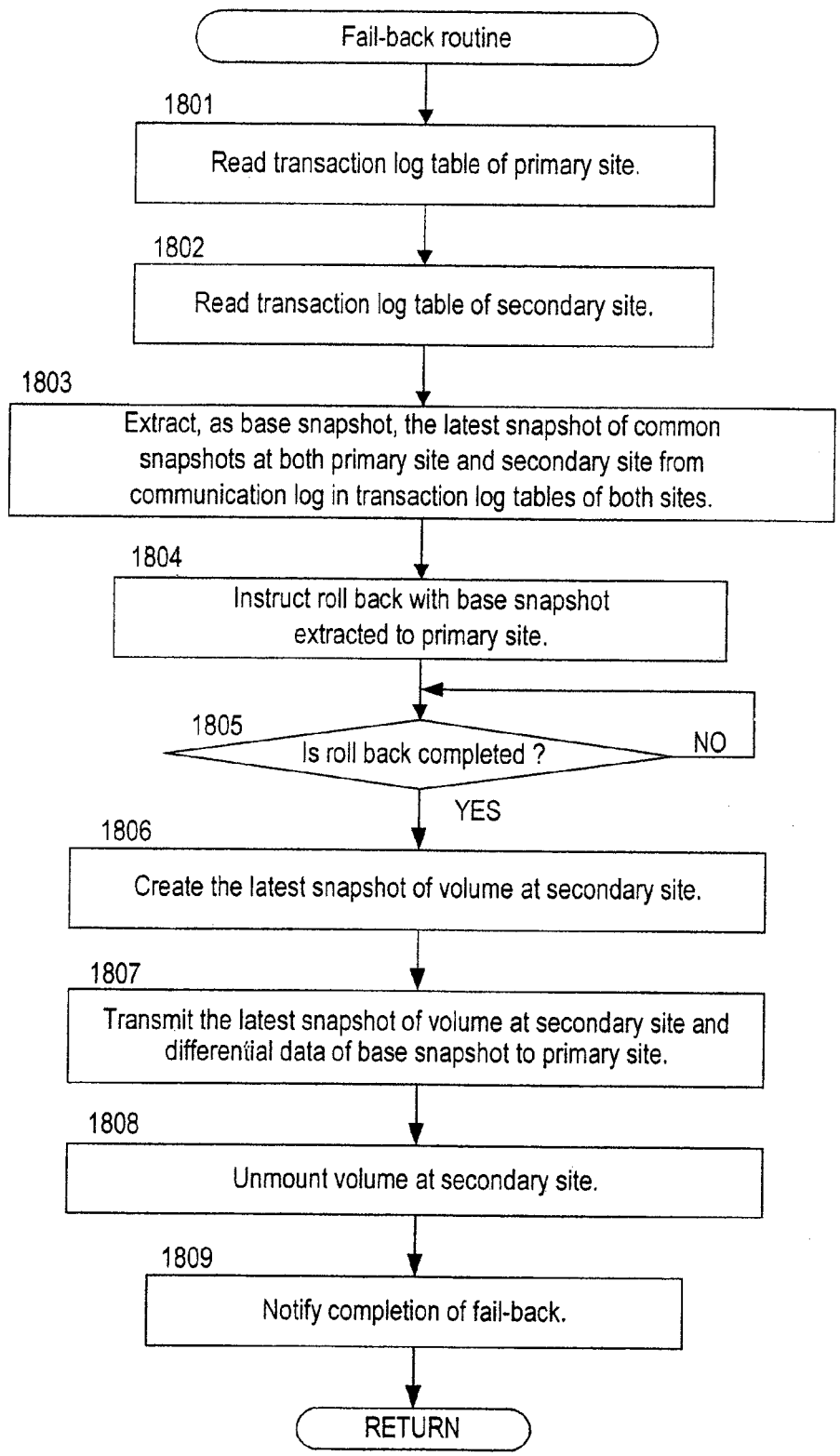
FIG. 17 is a flowchart illustrating an example of the process executed in the fail-back routine of the storage system as the fourth embodiment of this invention.

FIG. 16 and FIG. 17 illustrate a fourth embodiment. In this embodiment, the storage systems 101, 1011 of the first embodiment includes the fail-back routine 131 to execute the fail-back process. The other structure is similar to the first embodiment.

In FIG. 16, the memory 1032 of the controller 103 is capable of loading and executing the fail-back routine 131 in accordance with a demand from the management terminal 106. The other structure is similar to the first embodiment.

When the storage system 101 at the primary site 1 restores from a failure, the management terminal 106 transmits a command to start the fail-back (restore) process to the storage system 1011 at the secondary site 2.

Upon reception of the fail-back process start command, the storage system 1011 drives the fail-back routine 131 illustrated in FIG. 17 to execute the fail-back (restore) process. Hereinafter, an example of the fail-back (restore) process to be conducted in the storage system 1011 at the secondary site 2 will be explained with reference to the flowchart of FIG. 17.

The controller 103 of the storage system 1011 receives the fail-back (restore) command from the management terminal 106 and thereafter reads the transaction log table 120 from the storage system 101 at the primary site 1 in the step 1801 and also reads the transaction log table 120 of the storage system 1011 in the step 1802.

The storage system 1011 compares two transaction log tables 120 as illustrated in FIG. 12. Here, it is assumed that the fail-over is carried out at the time 11:00 as in the case of the first embodiment and the fail-back command is issued at the time 13:00. When the fail-back process starts, the snapshots 807, 809 at the times of 9:00 and 10:00 are held in the storage system 1011 at the secondary site 2 as illustrated in FIG. 12. On the other hand, the snapshots 806, 808, 810 at the times of 9:00, 10:00, 11:00 are held in the storage system 101 at the primary site 1. Reception history of the snapshots (differential data) at the times of 9:00, 10:00 are held in the transaction log table 120 at the secondary site 2 and the transmission history of the snapshots (differential data) at the times of 9:00, 10:00 are held in the transaction log table 120 in the primary site 1. Since the snapshot at the time 11:00 cannot be transmitted normally, the storage system 101 at the primary site 1 does not include the transmission history of the snapshot at the time 11:00 in the transaction log table 120.

In the step 1803, the storage system 1011 at the secondary site 2 extracts the latest snapshot among those which are matched in the time and volume from the transaction log tables 120 in the primary site 1 and secondary site 2. That is, the latest snapshot which also exists as the common snapshot in the two transaction log tables 120 of the primary and secondary sites is extracted as the base snapshot for the fail-back.

In an example of FIG. 12, the snapshot at the time 10:00 is the latest snapshot of the vol1 existing as the common snapshot in the primary and secondary sites. This snapshot is extracted as a base snapshot.

Next, in the step 1804, the storage system 1011 at the secondary site 2 instructs the storage system 101 at the primary site 1 to roll back the base snapshot extracted in the step 1803 to the vol1 (volume 804). The storage system 101 at the primary site 1 which has received such instruction executes the rollback, as illustrated in FIG. 13, by writing the snapshot 808 at the time 10:00 as the base snapshot to the volume 804. When the rollback is completed, the storage system 101 at the primary site 1 notifies completion of the rollback to the storage system 1011 at the secondary site 2 which has received the instruction.

The storage system 1011 at the secondary site 2 waits, in the step 1805, for completion of the rollback of the storage system 101 at the primary site 1. Upon reception of the communication indicating the completion of the rollback, the present snapshot 813 (refer to FIG. 13) of the volume 805 at the secondary site 2 is created in the step 1806.

In the step 1807, the differential data of the present snapshot 813 and the snapshot 809 at the time 10:00 which is the base snapshot is created and this differential data is then transmitted to the storage system 101 at the primary site 1. That is, the fail-back routine 131 drives the snapshot transfer routine 113 in FIG. 4.

The storage system 101 at the primary site 1 having received this differential data synchronizes with the volume 805 at the secondary site 2 by applying the differential data to the volume 804 as illustrated in FIG. 13 using the differential reception routine 115.

In this timing, the volume 805 at the secondary site 2 which has been used as the operating volume because of fail-over synchronizes with the volume 804 at the primary site 1 recovered.

Next, in the step 1808, the storage system 1011 at the secondary site 2 dismount the volume 805 from the operating volume and notifies that the fail-back (restore) has been completed to the management terminal 106 in the step 1809.

The management terminal 106 having received the notification mounts the volume 804 to the storage system 101 at the primary site 1 and sends a command to use the same volume as the operating volume. Accordingly, the fail-back to the volume 804 at the primary site 1 from the volume 805 at the secondary site 2 is completed.

Since the administrator is required only to send the fail-back command to the storage system 1011 in the fail-over state by mounting the fail-back routine 131 to the storage system 1011 (101) as explained above, the fail-back process can be executed quickly. Moreover, the storage system 1011 at the secondary site 2 reads the transaction log table 120 at the primary site 1 from the network 3 but it also reads the transaction log table 120 at the secondary site 2 from the internal volume and memory. Therefore, the time required for the fail-back process can further be reduced.

The embodiments described above suggest an example where the storage systems 101, 1011 are connected with the network 3, but it is also possible that the storage systems 101, 1011 are connected with a SAN (Storage Area Network) and that the storage systems 101, 1011 and client 803 and management terminal 106 are connected with an IP network.

In addition, the embodiments described above suggest an example where the administrators of the primary site 1 and the secondary site 2 use in common the management terminal 106. However, although not illustrated, it is also possible that the primary site 1 and the secondary site 2 respectively include the management terminal. Otherwise, only one administrator may manage both primary site 1 and secondary site 2.

As explained above, this invention can be applied to the storage system provided with a remote copy function which can constitute the disaster recovery system and to the disaster recovery system. Particularly, this invention can be applied to the NAS or the like.

While the present invention has been described in detail and pictorially in the accompanying drawings, the present invention is not limited to such detail but covers various obvious modifications and equivalent arrangements, which fall within the purview of the appended claims.

What is claimed is:

1. An information system comprising:
a first storage system, coupled to a first client computer, having a first volume accessed by the first client computer, first snapshots of the first volume, and a first log information on the first snapshots; and
a second storage system, coupled to a second client computer and the first storage system, having a second volume accessed by the second client computer, second snapshots of the second volume, and a second log information on the second snapshots,
wherein the first storage system records creation timings of the first snapshot into the first log information, and transmits a part of the first snapshots to the second storage system,
wherein the second storage system stores a copy of the first volume in a past into the second volume by applying the part of the first snapshots which are transmitted, and controls a creation of the second snapshots for keeping data stored in the second volume at timings, each associated with one of timings of the applications of the part of the first snapshots, with recording the creation timings of the part of the first snapshots as timings of the second snapshots Into the second log information,
wherein after receiving a fail-back request, the first storage system identifies one of the first snapshots and one of the second snapshots based on the first log Information and the second log information, both are corresponded to a common timing based on the first log information and the second log information, roll-backs data recorded in the first volume to the common timing using the one of the first snapshots, and applies an another part of the second snapshots which timings are newer than the common timing, and
wherein after receiving a fail-back request, the first storage system deletes a certain part of the first snapshots which timings are newer than the common timing, and information on the certain part of the first snapshots from the first log information.

2. An information system according to claim 1, wherein before the receiving a fail-back request, the first storage system deletes one or more of the first snapshots according to the number of the first snapshot recorded in the first log Information.

3. An information system according to claim 2, wherein the one or more of the first snapshots are included the oldest one of the first snapshots.

4. An information system according to claim 1, wherein the first storage system having a snapshot creating function, and wherein the first snapshot are created by executing the snapshot creating function at preset timings.

5. An information system according to claim 1, wherein the first storage system records the transmission history of the first snapshot into the first log Information.

6. A first storage system coupled to a first client computer and a second storage system, comprising:
a controller receiving an access request from the first client computer;
a first volume storing data of the access request;
first snapshots of the first volume; and
a first log information on the first snapshots,
wherein the first storage system records creation timings of the first snapshot Into
the first log information, and transmits a part of the first snapshots to the second storage system to store a copy of the first volume In a past in a second volume of the second storage system by applying the part of the first snapshots which are transmitted,
wherein after receiving a fail-back request, the first storage system identifies one of the first snapshots and one of the second snapshots, both are corresponded to a common timing, based on the first log information and a second log information recording a creation timings of the part of the first snapshots as timings of a second snapshots created by the second storage system for keeping data stored in the second volume at timings, each associated with one of timings of the applications of the part of the first snapshots, roll-backs data stored In the first volume to the common timing using the one of the first snapshots, and applies an another part of the second snapshots which timings are newer than the common timing, and wherein after receiving a fail-back request, the first storage system deletes a certain part of the first snapshots which timings are newer than the common timing, and information on the certain part of the first snapshots from the first log information.

7. A first storage system according to claim 6, wherein before the receiving a fail-back request, the first storage system deletes one or more of the first snapshots according to the number of the first snapshot recorded in the first log information.

8. A first storage system according to claim 7, wherein the one or more of the first snapshots are included the oldest one of the first snapshots.

9. A first storage system according to claim 6, wherein the first storage system having a snapshot creating function, and wherein the first snapshot are created by executing the snapshot creating function at preset timings.

10. A first storage system according to claim 6, wherein the first storage system records the transmission history of the first snapshot into the first log information.

11. A fail-back method of an information system having a first storage system and a second storage system, comprising the step of:
  storing data accessed by a first client computer coupled to the first storage system In a first volume of the first storage system, first snapshots of the first volume, and a first log information on the first snapshots;
  recording creation timings of the first snapshot into the first log Information;
  transmitting a part of the first snapshots from the first storage system to the second storage system;
  storing a copy of the first volume in a past in a second volume of the second storage system, by applying the part of the first snapshots which are transmitted;
  controlling a creation of the second snapshots for keeping data stored in the second volume at timings, each associated with one of timings of the applications of the part of the first snapshots, with recording the creation timings of the part of the first snapshots as timings of the second snapshots into the second log information,
  wherein a after receiving a fail-back request by the first storage system, the method comprising:
  identifying one of the first snapshots and an one of the second snapshots, both are corresponded to a common timing, based on the first log information and the second log information;
  roll-backing data stored in the first volume to the common timing using the one of the first snapshots;
  applying an another part of the second snapshots which timings are newer than the common timing; and
  deleting a certain part of the first snapshots which timings are newer than the common timing, and information on the certain part of the first snapshots from the first log information.

12. A fall-back method according to claim 11, wherein before the receiving a fail-back request, step comprising:
  deleting one or more of the first snapshots according to the number of the first snapshot recorded in the first log information.

13. A fail-back method according to claim 12, wherein the one or more of the first snapshots are included the oldest one of the first snapshots.

14. A fail-back method according to claim 11, wherein the first storage system having a snapshot creating function, and wherein the first snapshot are created by executing the snapshot creating function preset timings.

15. A fail-back method according to claim 11, wherein the first storage system records the transmission history of the first snapshot into the first log information.

* * * * *